UNITED STATES PATENT OFFICE.

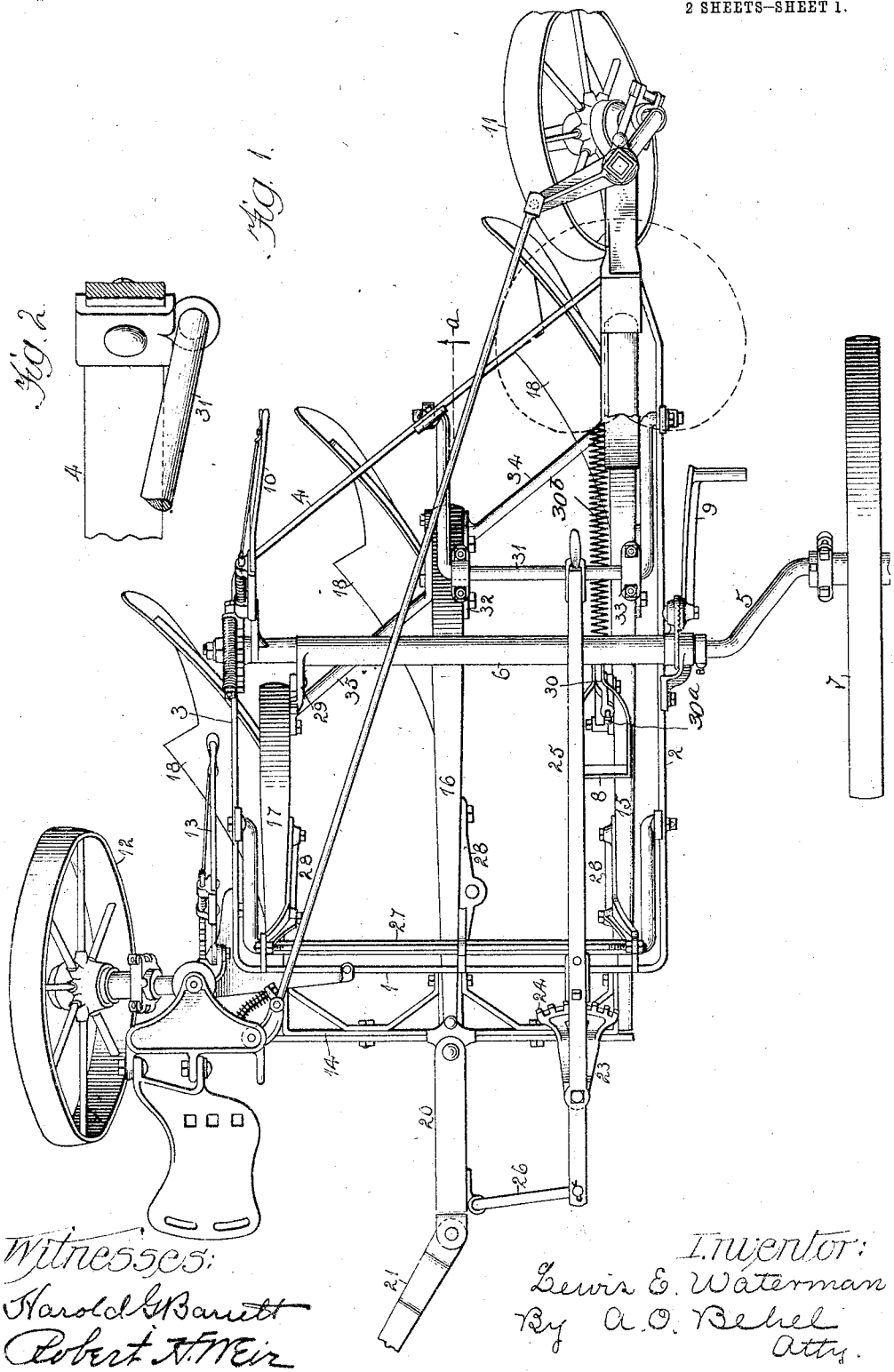

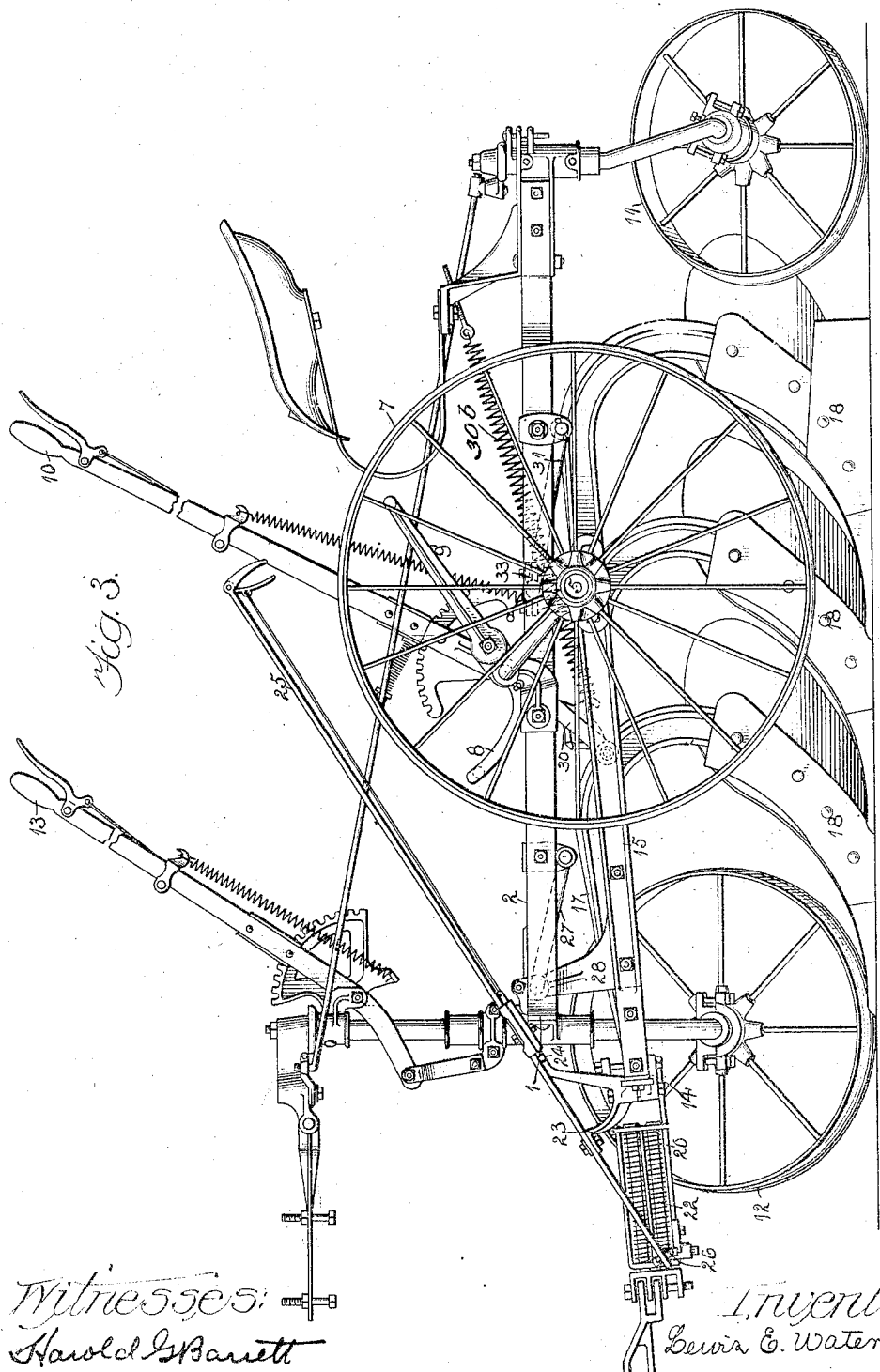

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

WHEELED PLOW.

1,025,768.

Specification of Letters Patent. Patented May 7, 1912.

Application filed March 19, 1910. Serial No. 550,546.

*To all whom it may concern:*

Be it known that I, LEWIS E. WATERMAN, a citizen of the United States, residing at Rockford, in the county of Winnebago and State of Illinois, have invented certain new and useful Improvements in Wheeled Plows, of which the following is a specification.

The object of this invention is to construct a triple gang plow in which the main frame has its rear bar arranged diagonally to the line of draft and to which rear bar one end of a bail is pivoted, thereby shortening the length of the bail, also the length of one side of the frame.

In the accompanying drawings, Figure 1 is a plan view of my improved wheel plow. Fig. 2 is a section on dotted line *a* Fig. 1. Fig. 3 is a land side elevation.

The main frame comprises the forward bar 1, land side bar 2, furrow side bar 3 and rear end bar 4. The furrow side bar 3 is shorter than the land side bar which locates the rear bar 4 diagonally to the line of draft for a purpose to appear hereinafter. A land wheel axle 5 is supported by the bars 2 and 3 of the main frame, and a sleeve 6 receives this axle and is located between the bars 2 and 3. A land wheel 7 supports the axle 5. Foot levers 8 and 9 are connected with the sleeve 6, and a hand lever 10 is connected with the axle 5 by which the axle may be oscillated to raise or lower the land side of the main frame. A caster wheel 11 is connected to the main frame at the junction of the bars 2 and 4. A furrow wheel 12 is connected to the main frame at the junction of the bars 1 and 3. The hand lever 13 for raising and lowering the furrow side of the main frame is of an old construction and need not here be described in detail. A bar 14 is located in advance of the front bar 1 of the main frame and to it are connected the forward ends of three plow beams 15, 16 and 17, each beam having a plow 18 connected to it. A draft arrangement comprises the frame 20 pivoted to the bar 14. The clevis 21 is connected to the frame through the springs 22. A bracket 23 is secured to the bar 14 and has a toothed segment 24 formed integral therewith. A link 26 has one end pivotally connected with the hand lever 25, and its other end pivotally connected with the frame 20. By means of this hand lever 25, the line of draft can be shifted laterally and held when adjusted.

A bail 27 is pivotally connected to the bars 2 and 3 of the main frame, and brackets 28 connected to the three plow beams, are pivotally connected with this bail 27. The plow beams 15 and 17 are each connected with the sleeve 6 by the links 30 and 29 respectively. The link 29 is hung between the beam 17 and a radial arm on the sleeve 6 and the link 30 similarly connects the beam 15 and an arm arranged on the sleeve 6, the said link and arm being disposed in the well known manner so as to toggle. A bail 31 is pivotally connected to the bars 2 and 4 of the main frame, and brackets 32 and 33 connect the plow beams 15 and 16 with the bail 31. The plow beams 15 and 16 are connected by the brace 34, and the plow beams 16 and 17 are connected by a brace 35. The three plows connected to the three plow beams are located one ahead of the other, that is, the plow of the beam 17 is farthest ahead, and the plow of the beam 15 is farthest in the rear with the plow of the beam 16 midway between these plows, and the bar 4 of the main frame is located substantially with the diagonal arrangement of the plows. By thus locating this rear bar of the main frame a short bail 31 can be employed as it is only connected to the rear portions of the two longer plow beams.

The foot lever 8 is employed to force down the plows which are held in such position by the links 29 and 30, forming a toggle lock, the adjusting screw for which is shown at 30ª. The foot lever 9 serves to break this toggle lock of the links, and the spring 30ᵇ will hold the plows elevated. By means of the foot lever 9, the sleeve 6 can be oscillated on the axle 5, and through the links 29 and 30, and the bails 27 and 31 the plow beams and plows will be elevated.

I claim as my invention—

1. In a plow, a main frame, a plurality of plowing members, a yoke pivoted to the main frame and to each of the members, another yoke pivoted to the main frame and to certain only of the plowing members, and means for raising and lowering the plowing members, said means being connected to one of the plowing members that is connected to both of the yokes and also being connected to one of the plowing members that is connected to one only of the yokes.

2. In a plow, a main frame, three plow-carrying beams, a yoke pivoted to the main frame and to two of the beams, and raising and lowering means for the beams connected to one of the two that is connected to the yoke, said raising and lowering means being also connected to the third beam that is not so connected.

3. In a plow, a main frame, three plow-carrying beams of different lengths, a yoke pivoted to the main frame and to the two longer beams, and raising and lowering means for the beams connected to one of said two longer beams and to the shortest beam.

4. In a plow, the combination with a main frame having a tapered rear end that includes a diagonally disposed rear bar, of three plow-carrying beams, a yoke pivoted to the main frame and to each of the plow-carrying beams at its front ends, another yoke pivoted to two of the plow-carrying beams at their rear ends and to the diagonally disposed rear bar of the frame, and raising and lowering means located between the yokes and connected to certain of the beams.

5. In a plow, the combination with a main frame, of a plurality of plow beams, a yoke pivoted to the main frame and to the front end of each of the beams, another yoke pivoted to the main frame and the rear ends of certain only of the beams, and raising and lowering means mounted on the frame between the yokes, said raising and lowering means being connected to one of the plow beams between its connection with both yokes and being connected also to a plow beam that is not attached to the rear yoke.

6. In a plow, the combination with a main frame, comprising a front bar, side bars of different lengths and a diagonally disposed rear bar, of three plowing beams of different lengths, a yoke pivoted to the front end of the main frame and to the front ends of each of the plowing beams, another yoke pivoted to one of the side bars and to the rear bar of the main frame, and also pivoted to two of the beams, a wheel an axle for said wheel mounted on the frame, a sleeve journaled on the axle, means for turning the sleeve, and links connecting the sleeve with one of the longer beams and with the shortest beam.

In testimony whereof I have hereunto set my hand in presence of two subscribing witnesses.

LEWIS E. WATERMAN.

Witnesses:
A. O. BEHEL,
E. D. E. N. BEHEL.